United States Patent
Garcia Morchon et al.

(10) Patent No.: US 9,407,609 B2
(45) Date of Patent: Aug. 2, 2016

(54) LIGHTING SYSTEM, A LIGHT SOURCE, A DEVICE AND A METHOD OF AUTHORIZING THE DEVICE BY THE LIGHT SOURCE

(75) Inventors: Oscar Garcia Morchon, Aachen (DE); Theodorus Jacobus Johannes Denteneer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 109 days.

(21) Appl. No.: 13/997,794

(22) PCT Filed: Dec. 20, 2011

(86) PCT No.: PCT/IB2011/055823
§ 371 (c)(1),
(2), (4) Date: Jun. 25, 2013

(87) PCT Pub. No.: WO2012/090122
PCT Pub. Date: Jul. 5, 2012

(65) Prior Publication Data
US 2013/0279697 A1     Oct. 24, 2013

(30) Foreign Application Priority Data
Dec. 30, 2010 (EP) .................................. 10197344

(51) Int. Cl.
*H04L 29/06* (2006.01)
*G09C 5/00* (2006.01)
(Continued)

(52) U.S. Cl.
CPC .............. *H04L 63/0428* (2013.01); *G09C 5/00* (2013.01); *H04B 10/116* (2013.01); *H04L 9/3215* (2013.01); *H04L 9/3271* (2013.01); *H05B 37/0272* (2013.01); *H04L 2209/805* (2013.01)

(58) Field of Classification Search
None
See application file for complete search history.

(56) References Cited

U.S. PATENT DOCUMENTS

| 2009/0026966 A1 | 1/2009 | Budde et al. |
| 2009/0140835 A1 | 6/2009 | You |

(Continued)

FOREIGN PATENT DOCUMENTS

| JP | 2003230181 A | 8/2003 |
| JP | 2010081499 A | 4/2010 |

(Continued)

OTHER PUBLICATIONS

Matthias Gauger et al; "Enlighten Me! Secure Key Assignment in Wireless Sensor Networks", pp. 1-10, http://www.wsnresearch.com/paper/gauger09enlightenme.pdf, Oct. 2009.

*Primary Examiner* — Christopher Revak
(74) *Attorney, Agent, or Firm* — Meenakshy Chakravorty (57) ABSTRACT

A lighting system (100), a light source (110), a device (150), and a method of authorizing the device (150) by the light source (110) are provided. The lighting system (100) comprises a light source (110) to emit light (116), a device (150) to control the light source(110), a first communication channel from the light source (110) to the device (150), and a second communication channel from the device (150) to the light source (110). The first communication channel is formed by modulating information in the emitted light (116) of the light source (110). The light source (110) comprises a challenge generator (118), a light source transmitter (112), a light source receiver (122) and an authorizing means (120). The challenge generator (118) generates a challenge with a cryptographic function receiving an argument comprising a first cryptographic key. The light source transmitter (112) transmits the challenge via the first communication channel. The light source receiver (122) receives a response from the device via the second communication channel. The authorizing means (120) authorizes the device (150) to control the light source (110) by matching the received response with a reference, and if the received response matches the reference, the device (150) is authorized. The device (150) comprises a device receiver (152), a response generator (154) and a device transmitter (156). The device receiver (152) receives the challenge via the first communication channel. The response generator (154) generates the response with the cryptographic function which receives arguments comprising the received challenge and a second cryptographic key. The device transmitter (156) transmits the response to the light source via the second communication channel.

15 Claims, 7 Drawing Sheets

(51) Int. Cl.
*H04B 10/116* (2013.01)
*H05B 37/02* (2006.01)
*H04L 9/32* (2006.01)

(56) References Cited

U.S. PATENT DOCUMENTS

2010/0110392 A1* 5/2010 Kaise et al. .................... 353/52
2010/0223461 A1* 9/2010 Drader et al. ................. 713/159
2011/0107092 A1* 5/2011 Krig .............................. 713/168
2014/0255036 A1* 9/2014 Jovicic et al. ................. 398/115

FOREIGN PATENT DOCUMENTS

| WO | 2007095740 A1 | 8/2007 |
| WO | 2008139360 A1 | 11/2008 |
| WO | 2009031110 A2 | 3/2009 |
| WO | 2009031112 A2 | 3/2009 |
| WO | 2010116299 A1 | 10/2010 |

* cited by examiner

LIGHTING SYSTEM, A LIGHT SOURCE, A DEVICE AND A METHOD OF AUTHORIZING THE DEVICE BY THE LIGHT SOURCE

FIELD OF THE INVENTION

The invention relates to the field of coded light systems. In such systems the light source transmits, in use, information via the light that is emitted by the light source, such that humans can not perceive the coding of the information in the light, while other devices, such as a remote controller, are enabled to extract the information from the emitted light. The information is, for example, an identifier of the light source. The other device may be pointed to the light source in operation, receives the emitted light on a photosensitive sensor and is capable of extracting the information from the signal generated by the sensor. The extracted information may comprise the light source identifier, which may be used to address the light source when control messages are sent back to the light source for controlling the operation of the light source. The control messages are often sent via another communication channel, for example, via infrared light or via radio signals. The light source may receive the control messages and uses the identifier that is part of the control message to determine whether the control message is addressed to the light source. If so, the control command of the control message is executed by the light source. By using this mechanism, a user may simply control a light source by pointing a remote controller to a light source and requesting a specific light effect. It is to be noted that the other device may be another light source which receives light from the first light source, and via this mechanism the other light source may control the light source.

BACKGROUND OF THE INVENTION

Published patent application WO2008/139360A1 discloses a method and a system for controlling a lighting system. A remote controller is used to measure the influence of one or more light sources at different positions in, for example, an office. These measurements are stored in a central controller and are used to control, later on, the light emission of the light sources of the lighting system to obtain a specific lighting pattern in the office. In an embodiment, the light sources of the lighting system may transmit their light source identifier (ID) coded in the light that is emitted by the light source. The remote controller is capable of extracting the light source ID from the received light, and the remote controller characterizes other features of the received light. The obtained information is transmitted to the central controller for storage in the central controller and for later use when the central controller has to control the lighting system to obtain the specific lighting pattern.

The remote controller may send a user request to the central controller to obtain a specific light pattern at a specific location. The central controller may subsequently control the light sources of the lighting system and the controlling is based on the earlier obtained measurements.

In an embodiment, the remote controller is capable of directly communicating with the light sources of the lighting system for directly controlling the light sources. Thus, besides the controlling of the light sources via the central controller, the lighting system of the cited patent application also comprises a traditional coded light subsystem wherein the remote controller is capable of directly controlling one or more the light sources.

In the discussed coded light subsystem, and the traditional coded light systems, a huge risk of mixing-up remote controllers exists. If different remote controllers are present in the same room, each one of the remote controllers may receive the information from the light source and may provide control commands to the light source of which the light source identifier is received. For example, if the system of the cited patent application is used in an office, a remote controller may be present at each one of the desks for controlling the light at the respective desks. These remote controllers may also be used to receive information of each one of the light sources of the lighting system and as such the remote controllers may be used to control each one of the light sources. However, this is not desirable in, for example, the office, as each employee may desire a different setting at their desks.

SUMMARY OF THE INVENTION

It is an object of the invention to provide a coded lighting system which prevents mixing-up different remote controllers.

A first aspect of the invention provides a lighting system as claimed in claim 1. A second aspect of the invention provides a light source as claimed in claim 13. A third aspect of the invention provides a device as claimed in claim 14. A fourth aspect of the invention provides a method as claimed in claim 15. Advantageous embodiments are defined in the dependent claims.

A lighting system in accordance with the first aspect of the invention comprises a light source to emit light, a device to control the light source, a first communication channel from the light source to the device, and a second communication channel from the device to the light source. The first communication channel is formed by modulating information in the emitted light of the light source. The light source comprises a challenge generator, a light source transmitter, a light source receiver and an authorizing means. The challenge generator generates a challenge with a cryptographic function receiving an argument comprising a first cryptographic key. The light source transmitter transmits the challenge via the first communication channel. The light source receiver receives a response from the device via the second communication channel. The authorizing means authorizes the device to control the light source by matching the received response with a reference, and if the received response matches the reference, the device is authorized. The device comprises a device receiver, a response generator and a device transmitter. The device receiver receives the challenge via the first communication channel. The response generator generates the response with the cryptographic function which receives arguments comprising the received challenge and a second cryptographic key. The device transmitter transmits the response to the light source via the second communication channel.

The solution of the invention for solving the problem of mixing-up devices is the provision of cryptographic keys and a cryptographic function in the light source and in the device such that the challenge that is generated by the light source depends on the first cryptographic key, and a such that the response which is generated by the device depends on the received challenge and the second cryptographic key. The light source expects a specific response, which is the reference, and this expectation is based on the use of a correct combination of the first cryptographic key and the second cryptographic key. For example, in a symmetric cryptographic system, the first cryptographic key and the second cryptographic key have to be the same to enable the device to generate a response which is expected by the light source. Thus, the use of cryptographic keys provides a mechanism which may be used to couple specific device to specific light sources. The light source will only allow the device to control the light source if the device is able to generate the correct response, in other words, if the device has the correct second cryptographic key. By, for example, programming specific combinations of cryptographic keys in the light sources and the devices of a lighting system, the mixing up of devices is prevented.

Traditionally, in the field of lighting systems, only one, or a few, luminaires were available per room and the problem of mixing-up the devices was not recognized. Traditionally only devices of a brand could communicate with the light source of the same brand based on brand-specific communication protocols. In the field of coded lighting systems a standard is being drafted and as such devices of a specific brand may control light sources of other brands. Thus, the risk of mixing-up the devices becomes a more prominent problem. Further, today many lighting systems use miniature light emitters and as such the number of light sources in a lighting system increases, which may, once again, result in a larger mixing-up problem. Based on the recognition that the use of the challenge and the response, which are generated with a cryptographic function having a cryptographic key as one of the arguments, can solve the mixing-up problem, the inventors have realized that such a mechanism may be implemented in the light source and in the device of a coded lighting system. It is to be noted that the challenge should have enough digits to prevent collision between different challenges generated by different light sources. The cryptographic function should be a function which generates such distinctive challenges. Further, the cryptographic function may be an encoding function, a hash function or a cipher based function.

The response and the reference match if the similarity between the reference and the response is high enough. In an embodiment, matching might mean that the response and the reference are equal. In another embodiment, the response and the reference match if more than a predefined number of digits of the two numbers are equal. In yet a further embodiment, the reference and the response match if the difference between the two values is below a predefined maximum value.

Authorizing means, in the context of the invention, that the authorized device has a correct cryptographic key and that the device may control the light source. It does not mean that the device is authenticated. In other words, as the result of the authorization the light source knows that a control command that is send together with the response has to be executed, or that control commands, which will be sent to the light source in an interval of time following the moment of authorization, has to be executed to control the emission of light by the light emitter of the light source. However, the light source does not exactly know which specific device is the device that is authorized.

The device of the lighting system may be any device which is configured to receive the light of the light source, deduct information of the light, and which is configured to transmit information back to the light source via a second communication channel. Thus, every device which is configured to control the light source may be the device of the lighting system. Optionally, the device may be another light source which is a master in the lighting system, meaning that this another light source is in control of the operation of the light source of the lighting system. In an embodiment, the device is a remote controller for controlling the light source.

It is to be noted that the cited patent application WO2008/139360A1 discusses the possibility of misuse of the therein disclosed lighting system, and discusses a possible solution. It has been proposed to provide an access control mechanism for the device by the central controller of the lighting system with public-key cryptography or symmetric-key cryptography. Thus, the cited patent application points to a solution which comprises the introduction of a central controller. Such a solution is different from the solution of the invention and is relatively expensive.

In an embodiment, the light source comprises a pre-programmed unique light source identifier and the challenge generator is configured to use the unique light source identifier as an additional argument for the cryptographic function. Thus, the generated challenge also depends on a unique number and thus the generated challenge is unique and does not collide with challenges of other light sources. This is especially advantageous when several light sources are used in the same area and wherein the device has to receive a unique challenge to prevent that challenges of different light sources are mixed up by the device. If the skilled person wants to have a unique challenge it seems to be logical to generate a random number with enough digits such that the probability of generating the same challenge by different light sources is low. However, for generating a random number, relatively large, and thus expensive, hardware blocks have to be included in the light sources, which result in relatively expensive light sources. By using a unique identifier, which is, for example, pre-programmed in the light source at the moment of production of the light source, or which is, for example, programmed in the light source when the light source was installed, the use of such an expensive random number generator in each one of the light sources is prevented. Thus, the solution of the embodiment is a relatively cheap solution for preventing the generation of colliding challenges. It is to be noted that the light source identifier is a number with enough digits to have enough unique light source identifiers available.

In a further embodiment, the first communication channel is a one-way broadcast channel. In other words, information which is transmitted through the first communication channel is transmitted away from the light source and may be received by a plurality of receivers being capable of receiving the broadcast information. It is to be noted that the broadcasting is not by definition in all direction, but may also be directed to a specific area: light that is emitted by the light source is emitted towards a specific area and all devices which are present in the light beam may receive information via the emitted light. Note that the devices may receive the information after a reflection of the light from an object, such a wall or floor.

In a further embodiment, the light source transmitter is configured to regularly broadcast an identifier via the first communication channel and wherein the light source transmitter is further configured to regularly broadcast the generated challenge as the identifier. Thus, in other words, no light source identifier is transmitted, but the generated challenge is transmitted. This provides a privacy advantage, because, if another device tries to break into the lighting system, that device cannot detect on basis of the information in the emitted light from which specific light source the information originates.

In another embodiment, the light source transmitter is configured to regularly broadcast the response instead of the challenge if the device is authorized by the light source. By starting to broadcast the response instead of the challenge, the device may detect in the received light that the information comprised in the emitted light equals the response which was sent earlier. This is a form of feedback and thus the device knows that it is authorized by the light source and thus the device knows that it may control the light source.

In an embodiment, the device transmitter transmits a message via the second communication channel. The message comprises an identifier of the light source. The device transmitter is configured to use the generated response as the identifier in the message. In other words, no light source identifier is used to address the light source, but the response is used as the identifier. This results in a further benefit from the privacy protection point of view: devices which are able to receive the messages of the second communication channel are not able to detect which light sources are controlled by the device. Especially, if this is used in combination with the previous embodiment, wherein the light source transmitter transmits the challenge instead of the identifier, the light source transmits a first pseudo identifier, and the device transmits a second pseudo identifier. Thus, it is impossible for other devices, which try to attack the system, to detect which specific light source emitted the first pseudo identifier and it is impossible for the other devices to detect which specific light source is addressed in the message. It is to be noted that, when pseudo-identifiers are used, it might be more difficult for the light source to identify the messages received via the second communication channel as being a message addressed to the light source. The light source might process all message and check the response of every message with the reference in order to overcome this problem. If there is a match the message was most probably addressed to the light source. Alternatively, the light source may also calculate the expected response and filter messages based on the calculated response.

In another embodiment, the challenge generator uses a previously generated challenge or a previously received response also as an argument for the cryptographic function. The previously generated challenge and the previously received response are previously generated numbers. This means that, as soon as such a previously generated number is used as an argument, the challenge changes to another value. Thus, seen in time, the successive challenges change. The changing of the challenges makes the lighting system more secure with respect to attacks to the system. Although that attacking devices may record the challenge that is emitted by the light source and the subsequently transmitted response of the device, the attacking devices do not have a clue of which response must be sent as soon as the challenge changes. The light source may have a memory for storing previously generated challenges or previously received responses, such that a previously number is available when the light source starts operating after a period of inactivity. It is to be noted that, when the light source is used for the first time, there is not a previously generated number available. Thus, the light source cannot use a previously generated number at its first use, but may use a number which has been pre-stored in the memory during the manufacturing of the light source. Such a pre-stored number may be a fixed number which is the same number for all light source, for example, 0, or may be a random number, which is different for different light sources.

In an embodiment, the light source may generate (and transmit) the same challenge on basis of a specific previously generated number during a predefined interval of time. After the predefined interval the challenge generator may switch to using another previously generated number as an argument for the cryptographic function. Thus, at regular moments in time the light source starts to transmit another challenge. In another embodiment, the light source only switched to the use of another previously generated number after the moment in time that the device was authorized.

In an embodiment, the challenge generator also generates the reference with the cryptographic function which receives arguments comprising the generated challenge and the first cryptographic key. It is advantageous to generate the reference in accordance with this embodiment when the light source has to check whether the second cryptographic key is the same as the first cryptographic key in that case the generated reference is the same as the generated response.

In a further embodiment, the light source comprises a pre-programmed unique light source identifier, and the light source further comprises a light source concatenation means which concatenates the challenge to the light source identifier. The concatenation of the light source identifier and the challenge is transmitted by the light source transmitter instead of transmitting the challenge alone. Thus, the information which is transmitted via the first communication channel does also comprise the light source identifier, which may be advantageous when the device has to know from which specific light source the challenge originates. However, the privacy effect discussed in another embodiment is not present in this embodiment.

In another embodiment, the device further comprises a device concatenation means for concatenating the generated response to the received challenge. The concatenation of the challenge and the response is transmitted by the device transmitter instead of transmitting the response alone. Thus, the light source may detect in the received concatenation that the challenge is included which was previously sent via the first communication channel, and, consequently, the light source immediately understands that the received information (comprising the response) is addressed to the light source and as such that it has to match the response with the reference. It prevents the light source from having to match every receiver's response with the reference because it is immediately clear which received concatenations is addressed to the light source.

If, according to the previously described embodiment, the light source identifier is concatenated to the challenge, the device concatenation means may also concatenate the light source identifier to the generated response and/or to the received challenge. If the light source identifier is concatenated, it is even much clearer for the light source that the message comprising the concatenation is addressed to the light source. It is to be noted that the privacy effect, which has been discussed in another embodiment, is not present in this embodiment.

In an embodiment, the device further comprises a control command receiving means which receives from a user a control command for controlling the light source. The device transmitter transmits the control command together with the response, for example, in a single message. The light source further comprises a light source controller which is capable of executing control command which is received together with the response. The light source controller only executes the control command if the device is authorized by the light source.

The controlling of the light source depends on the authorization of the device by the light source. Thus, a secure access mechanism has been provided which only allows specific devices, which have the correct second cryptographic key, to control the light source. In this embodiment, the control message is already sent with the response to the light source and as such no additional control messages have to be sent from the device to the light source. As a consequence the embodiment is relatively efficient with respect to transmission bandwidth.

In another embodiment, the lights source allows the reception of a light source control command via the second communication channel during a predefined interval of time following the moment of time at which the device is authorized by the light source. The light source further comprises a light source controller for executing the received light source control command. Thus, the light source controller controls the operation of a light emitter of the light source if the received light source control command is executed.

According to the embodiment, the challenge-response communication is used for authorizing the device, and in subsequent communication the device may sent light source control commands to the light source during a predefined interval of time. Thus, after authorization there is a time interval during which the device is allowed to transmit light source control command without being authorized once again. This does not require that the device has to receive the (possibly changed) challenge once again (by extracting the challenge from the emitted light of the light source) and has not to transmit a response back, and thus the user may move the device to another position where the light emitted by the light emitter does not fall on the photosensitive sensor of the device.

The embodiment may be combined with another earlier discussed embodiment. The device may be informed about the authorization on basis of an earlier described embodiment. In the earlier described embodiment the light emitter starts to transmit the response via the first communication channel after authorization, which is an indication for the device that the predefined interval has been started.

According to a second aspect of the invention, a light source is provided for use in the system according to the first aspect of the invention. The light source comprises the same means as the light source of the system according to the invention.

According to a third aspect of the invention, a device is provided for use in the system according to the first aspect of the invention. The device comprises the same means as the light source of the system according to the invention.

The light source according to the second aspect of the invention and the device according to the third aspect of the invention provide the same benefits as the lighting system according to the first aspect of the invention and have similar embodiments with similar effects as the corresponding embodiments of the lighting system.

In another embodiment, a luminaire is provided which comprises the light source according to the second aspect of the invention.

According to a fourth aspect of the invention, a method of authorizing a device by a light source for allowing the device to control the light source. The method comprises the steps of:
i) generating a challenge with a cryptographic function receiving an argument comprising a first cryptographic key,
ii) transmitting the challenge from the light source to the device via a first communication channel being formed by modulating information in the emitted light of the light source, iii) receiving the challenge from the first communication channel, iv) generating a response with the cryptographic function receiving the received challenge and a second cryptographic key as arguments, v) transmitting the response from the device to the light source via a second communication channel, vi) receiving the response from the second communication channel, and vii) authorizing the device by matching the received second pseudo identifier with a reference, and, if the received second pseudo identifier matches the reference, the device is authorized by the light source.

The method according to the fourth aspect of the invention provides the same benefits as the lighting system according to the first aspect of the invention and has similar embodiments with similar effects as the corresponding embodiments of the lighting system.

The steps i), ii), vi) and vii) are performed by means of the light source. The steps iii), iv) and v) are performed by means of the device.

In an embodiment, a computer program product is provided which comprises instructions for causing a processor of a light source to perform the steps of generating a challenge with a cryptographic function receiving an argument comprising a first cryptographic key and authorizing a device by matching a received second pseudo identifier with a reference.

In another embodiment, a computer program product is provided which comprises instructions for causing a processor of a device to perform the step of generating a response with the cryptographic function receiving a received challenge and a second cryptographic key as arguments.

It is to be noted that the invention is not limited to light sources or device which comprise only special purpose hardware, such as the challenge generator, the light source transmitter, the light source receiver, the authorizing means, the device receiver, the response generator and/or the device transmitter. In an embodiment the light source and/or the device may have a general purpose processor which is programmed to perform at least one of the tasks of, or at least a part of the tasks of the challenge generator, the light source transmitter, the light source receiver, the authorizing means, the device receiver, the response generator and/or the device transmitter.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system, the devices, the method, and/or of the computer program product, which correspond to the described modifications and variations of the system, can be carried out by a person skilled in the art on the basis of the present description.

It should be noted that items denoted by the same reference numerals in different Figures have the same structural features and the same functions, or are the same signals. Where the function and/or structure of such an item have been explained, there is no necessity for repeated explanation thereof in the detailed description.

The figures are purely diagrammatic and not drawn to scale. Particularly for clarity, some dimensions are exaggerated strongly.

DETAILED DESCRIPTION OF THE EMBODIMENTS

Figure 1:
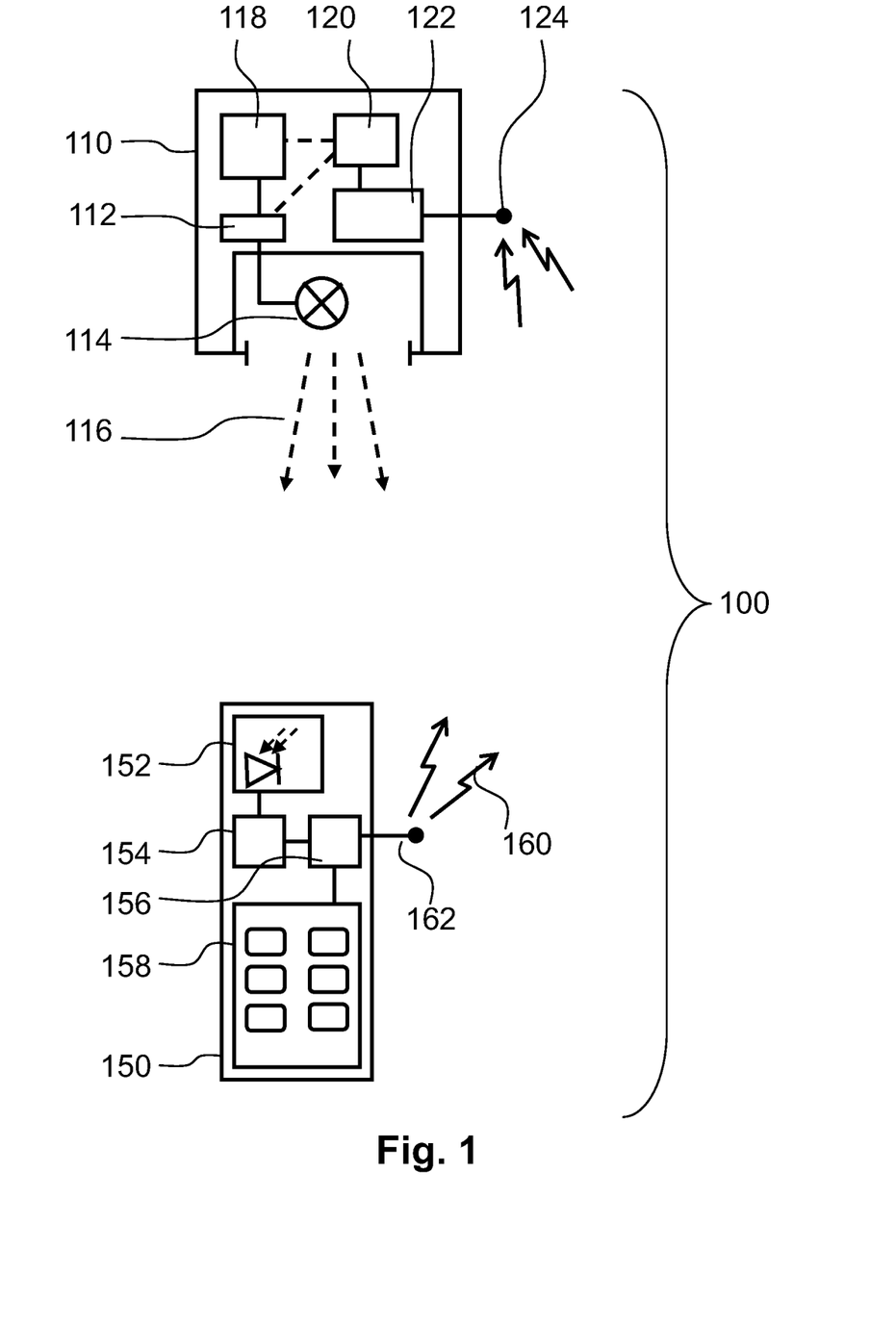
FIG. 1 schematically shows an embodiment of the lighting system according to the first embodiment of the invention, FIG. 2 schematically shows another embodiment of the lighting system, FIG. 3 schematically shows a first embodiment of a protocol which is implemented by the lighting system or being performed by the method according to the fourth aspect of the invention, FIG. 4 schematically shows a second embodiment of the protocol, FIG. 5 schematically shows a third embodiment of the protocol, FIG. 6 schematically shows a fourth embodiment of the protocol, and FIG. 7 schematically shows an embodiment of the method according to the fourth aspect of the invention.

A first embodiment of a system 100 according to the first aspect of the invention is shown in FIG. 1. The system 100 comprises a light source 110 and a remote controller 150. The system comprises a first communication channel being formed by information which is modulated in light 116 emitted by the light source 110. The system 100 further comprises a second communication channel being formed by radio waves 160 transmitted by the remote controller 150.

The light source 110 comprises a light emitter 114 which may emit light 116. Information may be modulated in the emitted light 116 such that human cannot perceive the information in the emitted light 116, while the remote controller 150 is able to extract the information from the light 116. Alternatively, the modulated information can be visible when visual inspection by a human is desired, for example, when the light source and the remote controller have to perform a pairing procedure. The light source 110 comprises a challenge generator 118 which generates a challenge with a cryptographic function. The cryptographic function receives at least a first cryptographic key as an argument. The challenge is provided to the light source transmitter 112 which transmits the challenge via the first communication channel. In other words, the light source transmitter 112 generates a driving signal for the light emitter 114. Depending on the driving signal, the light emitter 114 is in an emitting or non-emitting state. The driving signal is generated within the light source transmitter such that the challenge is coded into the light 116.

The remote controller 150 comprises a remote controller receiver 152 which comprises a photosensitive sensor for converting the received light into an electrical signal, and which comprises means to extract information which is coded in the light. Thus, the remote controller receiver 152 receives the challenge which is coded in the light 116. The received challenge is provided to a response generator 154 of the remote controller 150. The response generator generates a response with the cryptographic function which receives a number of argument at least including the challenge and a second cryptographic key. The cryptographic function may be the same cryptographic function as the cryptographic function of the challenge generator 118 of the light source 110. The response which is generated by the response generator 154 is provided to a remote controller transmitter 156. In a wireless system, as the system of FIG. 1, the remote controller transmitter 156 further a transmission signal to an antenna 162 such that the response is transmitted via the second communication channel, using radio waves 160, to the light source 110. It is to be noted that the embodiments of the invention are not limited to a second communication channel via radio waves. Other communication media may be used as well, such as, for example, infrared light.

The light source 110 comprises an antenna 124 for receiving the radio waves 160 which are emitted by the remote controller 150. If another communication medium is used, the antenna might not be required, but another means has to be provided which receives the signals via the another communication medium. The antenna 124 is coupled to a light source receiver 122 to receive the response which is transmitted via the second communication channel by the remote controller 150. The received response is provided to the authorization means 120 which may authorize the remote controller 150 to control the light source 110. The authorization means 120 matches the received response with a reference and if a match is found, the remote controller 150 is authorized by the light source 110.

The response and the reference match if the similarity between the reference and the response is high enough. In an embodiment, matching might mean that the response and the reference are equal. In another embodiment, the response and the reference match if more than a predefined number of digits of the two numbers are equal. In yet a further embodiment, the reference and the response match if the difference between the two values is below a predefined maximum value. The test which is executed to find out whether the response and the reference match has to fit the cryptographic system that has been used. One may use, for example, a cryptographic function which generates challenges and response of which, for example, the first two digits differ from other generated challenges and response when the used keys differ with at least one digit. In such a system one may distribute different keys to difference devices to allow the devices with the different keys to control one specific light source.

Figure 2:
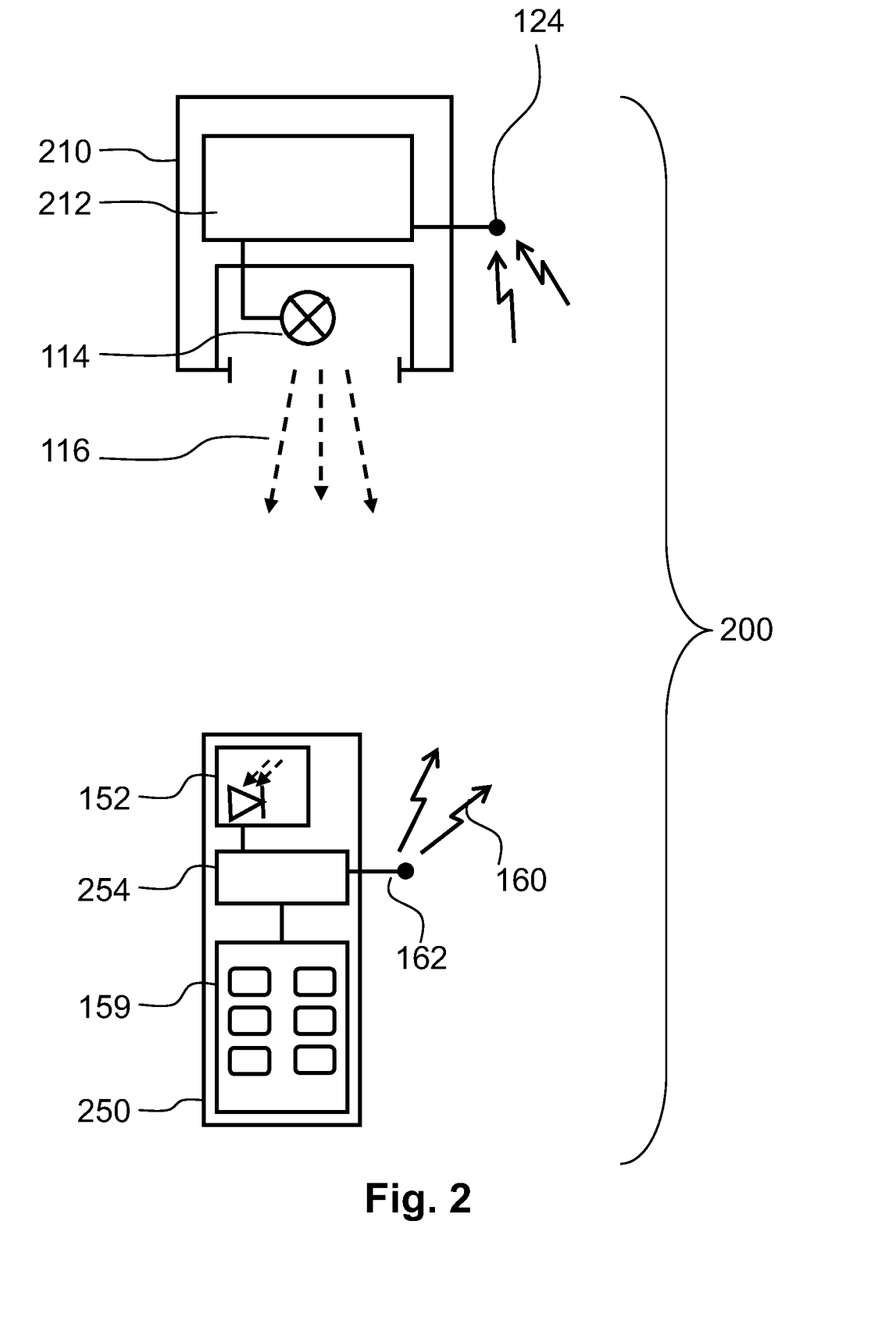

In an embodiment, the challenge generator also generates the reference ref The reference is used when a response is received and if the received response matches to the generated reference, the remote controller 150, 250 may be authorized by the light source 110, 210.

In an embodiment, as shown in FIG. 1, the authorizing means may be coupled to the challenge generator 118. If the remote controller 150 is authorized by the authorizing means, the received response is provided to the challenge generator 118 such that the received response may be used as one of the arguments of the cryptographic function to generated another challenge. In another embodiment, the authorizing means 120 may be coupled to the light source transmitter for transmitting the received response if the remote controller 150 is authorized by the light source 110.

In an embodiment, the remote controller 150 may further comprise a control command receiving means 158 which may be used by a user to provide a control command to control the light source 110. The received control command is provided to the remote controller transmitter which transmits the control command via the second communication channel towards the light source. The remote controller 150 may send the control command together with the response in a single message to the light source 110, or the control command may be sent in a separate message to the light source 110 with including the response in the message.

In FIG. 2 another embodiment of a lighting system 200 is provided. The lighting system 200 comprises a light source 210 and a remote controller 250. The system further comprises two communication channels which are similar to the communication channels of the system 100 of FIG. 1. Thus, the light 116 emitted by the light emitter 114 of the light source 210 comprises information which is invisibly coded into the light 116 thereby forming the first communication channel. The second communication channel is formed by radio waves 160 which are transmitted by the remote controller 250 and which are received by the light source 210. The light source 210 comprises a processor 212 which performs the tasks of the challenge generator 118, light source transmitter 112, the light source receiver 122 and/or the authorizing means 120 of the light source 110 of FIG. 1. The remote controller 250 comprises a processor 254 which performs the tasks of the response generator 154 and/or the remote controller transmitter 156 of the remote controller 150 of FIG. 1. It is to be noted that the light source 110, 210 and/or the remote controller 150, 250 may both have a processor which is programmed to perform all or only some of the tasks of the special purpose hardware blocks 118, 112, 120, 122, 152, 154, 156 and may still have some of the special purpose hardware blocks 118, 112, 120, 122, 152, 154, 156. Further, the processors 212, 254 may have volatile and/or non-volatile memory wherein information is being stored. In the non-volatile memory of the processor 212 of the light source 210 a unique light source identifier (ID) may be stored which may also be used as an argument of the cryptographic function when generating the challenge. Further, the processors 212, 254 may be configured to perform other tasks like concatenating the challenge (or the response) to the light source ID. The light source 110, 210 and/or the remote controller 150, 250 may also have special purpose hardware to perform the concatenation of different types of information. Further, the processor 212 of the light source 210 may be used to control the operation as the light source in accordance with control commands which are received from the remote controller.

The system 100 of FIG. 1 and the system 200 of FIG. 2 provide means to execute a protocol for authorizing the remote controller 150, 250 by the light source 110, 210. In FIGS. 3, 4, 5 and 6 embodiments of the protocol are discussed.

Figure 3:
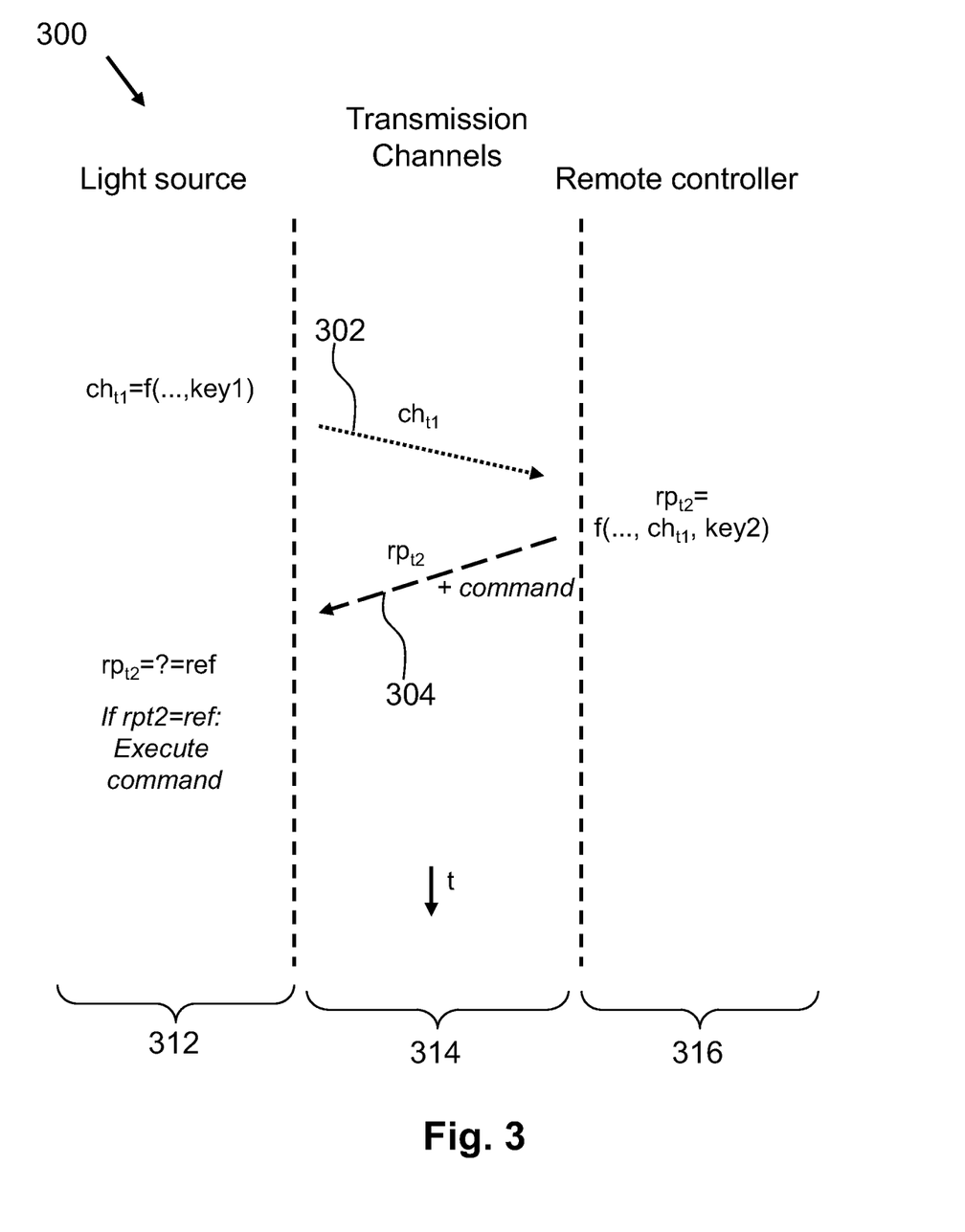

In FIG. 3 an authorization protocol 300 is shown. The actions performed by the light source 110, 210 are presented at the left end 312 of the figure. The exchange of information via the transmission channels is presented in the middle part 314 of the figure. If a dotted line (as line 302) is drawn in the middle part 314, a first communication channel is used which uses light that is transmitted by the light source 110, 210 as a transmission carrier. If in a dashed line (as line 304) is drawn in the middle part 314, a second communication channel is used which uses, for example, radio waves or infrared light as a transmission carrier. The actions performed at the remote controller 150, 250 are presented at the right end 316 of the figure. The vertical direction is the dimension of time. An action shown at the top of the figure is performed earlier as an action performed at the bottom of the figure.

As seen in FIG. 3, the first action, which is performed at the moment of time t1, is the generation of a challenge $ch_{t1}$. The challenge $ch_{t1}$ is generated with a cryptographic function $f(\ldots)$ and one of the arguments of the cryptographic function $f(\ldots)$ is the first cryptographic key key1. In other embodiments the cryptographic function $f(\ldots)$ may receive more arguments. The generated challenge $ch_{t1}$ is transmitted from the light source 110, 210 to the remote controller 150, 250 via the first communication channel 302. Subsequently, the remote controller 150, 250 generates, at a second moment of time t2, a response $rp_{t2}$ with the cryptographic function $f(\ldots)$. The arguments to the cryptographic function are at least the received challenge $ch_{t1}$ and a second cryptographic key key2. The generated response $rp_{t2}$ is transmitted from the remote controller 150, 250 to the light source 110, 210 via the second communication channel 304. At a third moment in time, the light source 110, 210 matches the received response $rp_{t2}$ with a reference. If there is a match, in other words, if the similarity between the reference and the received response $rp_{t2}$ is high enough, the remote controller 150, 250, is authorized to control the light source 110, 210.

The challenge $ch_{t1}$ should be a long enough number to prevent collision between different challenges generated by different light sources. In an embodiment the challenge is at least 80 bits long. In another embodiment, the challenge is at least 128 bits long. Further, the cryptographic function $f(\ldots)$ should be a function which generates distinctive challenges $ch_{t1}$ if the values of the arguments differ. In other words, the cryptographic function should have a distinctive character.

In the embodiments of FIG. 1 and FIG. 2 the light source authorizes a remote controller for controlling the light source. However, the remote controller 150, 250 may also be another type of device, for example, another light source which is a master of the lighting system and which has to control other light sources in the lighting system. Although in the embodiments of FIG. 1 and FIG. 2 the two communication channels are different channels because one channel uses visible light as an information carrier and the other channel uses radio waves or infrared light as an information carrier. However, when two light sources are used and one light source has to control the other light source, the first communication channel and the second communication channel may be formed by modulating information in visible light. In such a configuration, the distinction between the first communication channel and the second communication channel is mainly formed by the light source which modules the information in the light.

As shown in FIG. 3, the remote controller 150, 250 may transmit a control command to the light source 110, 210 together with the generated response $rp_{t2}$. If the received response $rp_{t2}$ matches with the reference, the received control command command is executed by the light source at a fourth moment in time, thereby controlling the operation of the light source in accordance with the control command command. In some settings, especially when the response does not have to exactly match the reference, some bits or digits of the response might be redundant and in such cases the redundant bits or digits may be used to communicate the command to the light source.

Figure 4:
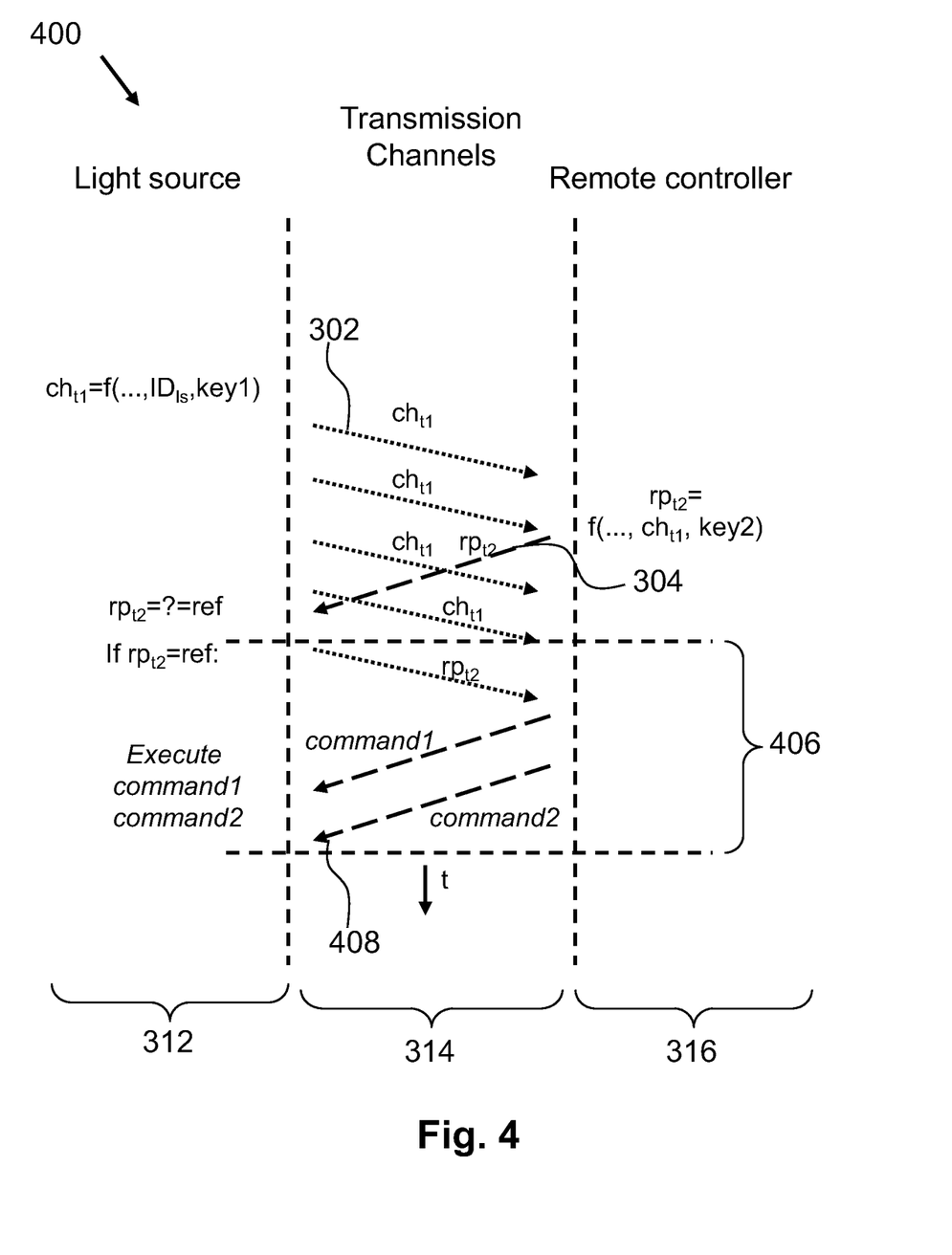

In FIG. 4 another embodiment of an authorization protocol 400 is shown. At a first moment in time t1 the light source 110, 210 generates a challenge $ch_{t1}$ with a cryptographic function $f(\ldots)$ which receives a unique light source identifier $ID_{ls}$ and a first cryptographic key as arguments. Thus, the generated challenge $ch_{t1}$ is different from other challenges generated in other light source, because in the other light sources the light source identifier is different. The light source 110, 210 transmits the generated challenge $ch_{t1}$ at regular moments in time via the first communication channel 302. At a particular moment in time, the remote controller 150, 250 receives the transmitted challenge $ch_{t1}$ and generates a response $rp_{t2}$ in the same manner as it is discussed in the authorization protocol 300 of FIG. 3. The generated response $rp_{t2}$ is transmitted to the light source 110, 210 via the second communication channel 304. The light source 110, 210 receives the transmitted response $rp_{t2}$ and matches the received response with a references ref. If there is a match, the response $rp_{t2}$ is transmitted back to the remote controller 150, 250 via the first communication channel 302. At the same moment in time as the moment in time at which the remote controller 150, 250 was authorized to control the light source 110, 210 an interval of time 406 is started during which it is allowed to control the light source via sending control commands via the second communication channel 304 to the light source 110, 210. In FIG. 4 it is shown that during the interval of time 406 the remote controller 150, 250 transmits two control commands command1, command2 to the light source 110, 210, and that the light source 110, 210 executes the control commands such that the operation of the light source 110, 210 is controlled in accordance to the received commands.

Figure 5:
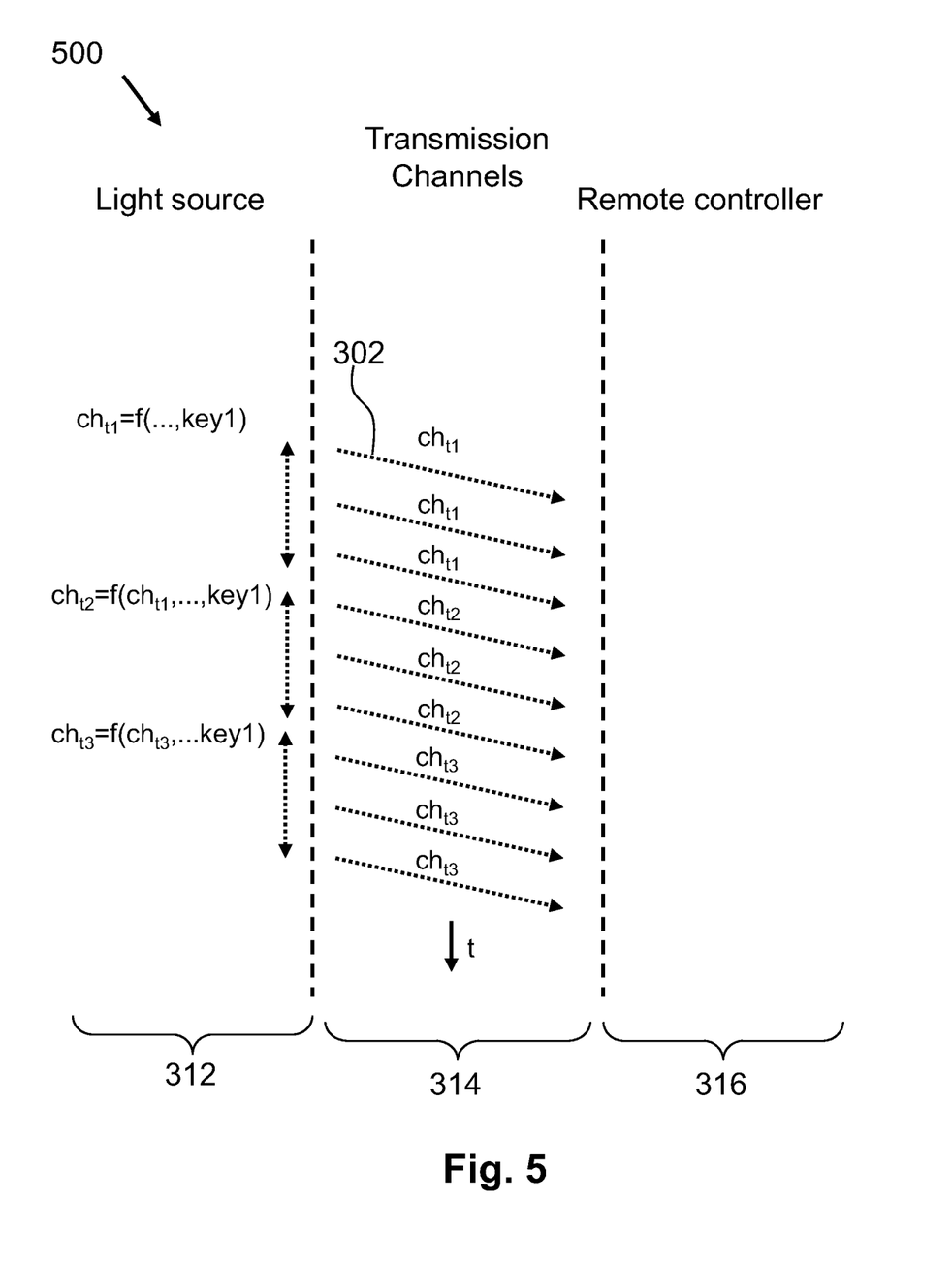

In FIG. 5, another embodiment of an authorization protocol 500 is shown. It is to be noted that in FIG. 5 no activities are presented at the side of the remote controller 150, 250, however, the remote controller 150, 250 may respond to the received challenges $ch_m$ in the same way as has been presented in other embodiment of the authorization protocols 300, 400, 600 of FIGS. 3, 4 and 6.

FIG. 5 depicts an embodiment of the light source 110, 210 in which the light source 110, 210 uses the previously generated challenge $ch_{m-1}$ for generating the challenge $ch_m$. As shown, at a second moment in time t2, the generated challenge $ch_{t2}$ is generated with the cryptographic function $f(\ldots)$, which receives the challenge $ch_{t1}$ generated at a first moment in time t1, as one of the arguments. The same applies to the third moment in time t3, at which moment in time the challenge $ch_{t2}$ generated at the second moment in time t2, is used as one of the arguments of the cryptographic function $f(\ldots)$. In the embodiment of FIG. 5, each generated challenge $ch_m$ is repeatedly transmitted during an interval of time. In another embodiment, a generated challenge $ch_m$ is not changed until the remote controller 150, 250 is authorized by the light source 110, 210. After authorization, in a first embodiment, the received response $rp_{m-1}$ may be used as an argument of the cryptographic function $f(\ldots)$, and in a second embodiment the previously generated challenge $ch_{m-1}$ may be used.

Figure 6:
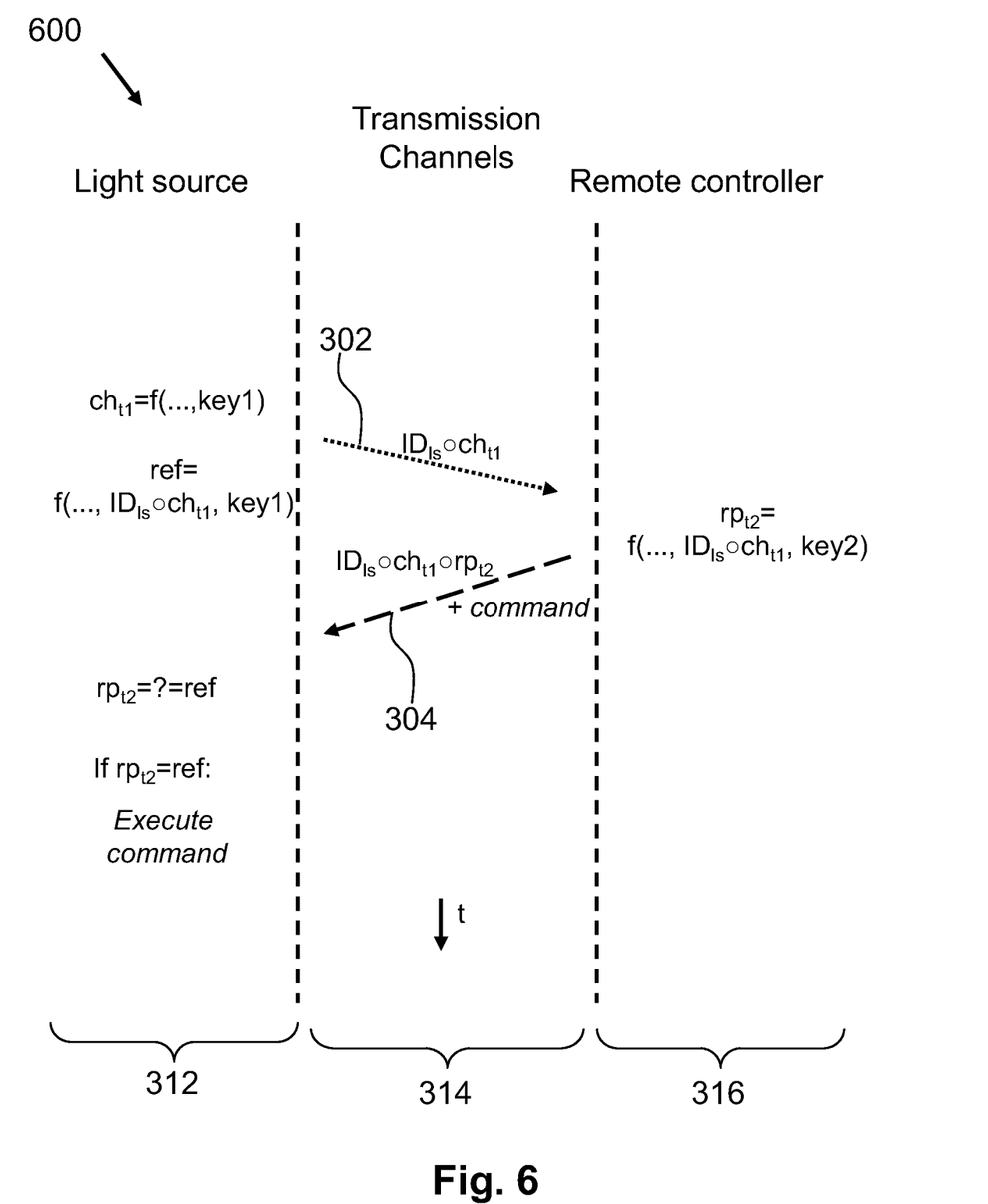

In FIG. 6, a further embodiment of an authorization protocol 600 is presented. The authorization protocol 600 is similar to the authorization protocol 300 of FIG. 3, however, more information is transmitted via the communication channels and more information is being used to generate the response $rp_{t2}$. Instead of only transmitting the generated challenge $ch_{t1}$, a unique light source identifier $ID_{ls}$ of the light source is concatenated with the generated challenge $ch_{t1}$. It is to be noted that the symbol $\circ$ is used to indicate a concatenation of two values. The concatenation $ID_{ls} \circ ch_{t1}$ of the unique identifier $ID_{ls}$ and the generated challenge $ch_{t1}$ is transmitted via the first communication channel from the light source 110, 210 to the remote controller 150, 250. Immediately after transmitting the concatenation $ID_{ls} \circ ch_{t1}$, the light source 110, 210 generates a reference ref which is used at a later moment in time to match with a received response $rp_{t2}$. The reference ref represents the expected response. The reference ref is generated with the cryptographic function which receives at the first cryptographic key and the transmitted concatenation $ID_{ls} \circ ch_{t1}$ as arguments.

If the light source identifier $ID_{ls}$ has always the same number of digits, the remote controller may deduct the light source identifier $ID_{ls}$ from the received concatenation $ID_{ls} \circ ch_{t1}$. In the shown embodiment of FIG. 6 the generated response $rp_{t2}$ is not only based on the received challenge $ch_{t1}$, but also on the light source identifier $ID_{ls}$, because the concatenation $ID_{ls} \circ ch_{t1}$ is an argument of the cryptographic function $f(\ldots)$. However, the embodiment is not limited to using the concatenation $ID_{ls} \circ ch_{t1}$ when generating the response $rp_{t2}$ instead of using the concatenation $ID_{ls} \circ ch_{t1}$ as an argument, only the challenge $ch_{t1}$ may be used. Subsequently, the generated response $rp_{t2}$ is concatenated to the received challenge $ch_{t1}$, or to the received light source identifier $ID_{ls}$, or concatenated to the received concatenation $ID_{ls} \circ ch_{t1}$ of the light source identifier $ID_{ls}$ and the challenge $ch_{t1}$. In the specific embodiment of FIG. 6, the generated response $rp_{t2}$ is concatenated to the received concatenation $ID_{ls} \circ ch_{t1}$ and as such the concatenation $ID_{ls} \circ ch_{t1} \circ rp_{t2}$ is transmitted from the remote controller 150, 250 to the light source 110, 210 via the second communication channel 304.

The light source 110, 210 may detect by simply inspecting the first digits of the received concatenation $ID_{ls} \circ ch_{t1} \circ rp_{t2}$ the value of the light source identifier $ID_{ls}$, and thus, the light source 110, 210 may easily detect whether the transmitted information is addressed to the light source 110, 210. Further, at the light source 110, 210, the response $rp_{t2}$ is extracted from the received concatenation and being matched with the reference ref. If there is a match, in other words, if the reference ref equals the response $rp_{t2}$, the remote controller 150, 250 is authorized by the light source 110, 210 to control the light source 110, 210.

The remote controller 150, 250 may send, together with the concatenation $ID_{ls} \circ ch_{t1} \circ rp_{t2}$, a control command command, and if the remote controller 150, 250 is authorized by the light source 110, 210, the received control command command is executed by the light source 110, 210 such that the emission of light by the light source 110, 210 is changed in accordance with the control command command.

Figure 7:
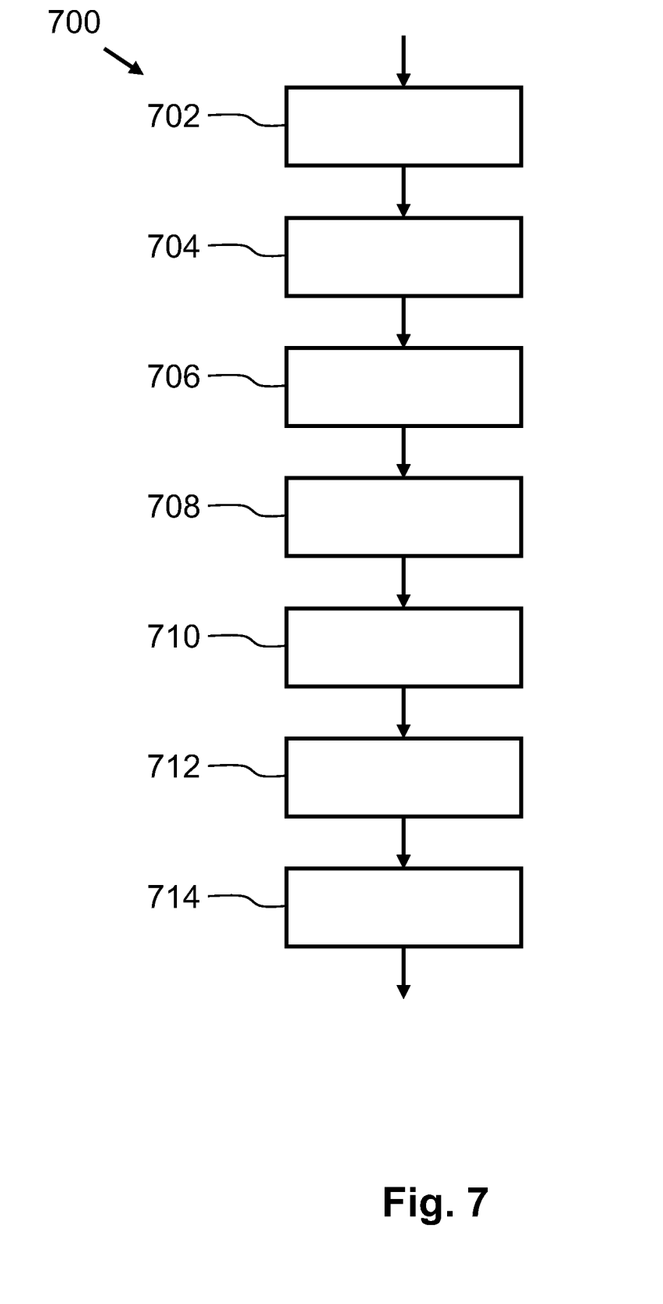

In FIG. 7 a method 700 according to the fourth aspect of the invention is provided. The method 700 comprises the steps of i) generating 702 a challenge with a cryptographic function receiving a first cryptographic key as an argument, ii) transmitting 704 the challenge from the light source to the device via a first communication channel being formed by modulating information in the emitted light of the light source, iii) receiving 706 the challenge from the first communication channel, iv) generating 708 a response with the cryptographic function receiving the received challenge and a second cryptographic key as arguments, v) transmitting 710 the response from the device to the light source via a second communication channel, vi) receiving 712 the response from the second communication channel, and vii) authorizing 714 the device by matching the received second pseudo identifier with a reference, and, if the received second pseudo identifier matches the reference, the device is authorized by the light source.

In an embodiment, a computer program product is provided which comprises instructions for causing a processor of a light source to perform the steps of generating a challenge with a cryptographic function receiving an argument comprising a first cryptographic key and authorizing a device by matching a received second pseudo identifier with a reference. The computer program product may further comprise instructions for at least partly performing the step of transmitting the challenge from the light source to the device via a first communication channel being formed by modulating information in the emitted light of the light source and for at least partly performing the step of receiving the response from the second communication channel.

In another embodiment, a computer program product is provided which comprises instructions for causing a processor of a device to perform the step of generating a response with the cryptographic function receiving a received challenge and a second cryptographic key as arguments. The computer program product may further comprise instructions for at least partly performing the step receiving the challenge via the first communication channel and for at least partly performing the step of transmitting 710 the response from the device to the light source via a second communication channel.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system comprising a light source for emitting light, a device for controlling the light source, a first communication channel from the light source to the device, the first communication channel being formed by modulating information in the emitted light of the light source, and a second communication channel from the device to the light source, the light source comprising:
   a challenge generator for generating a challenge with a cryptographic function receiving an argument comprising a first cryptographic key,
   a light source transmitter for transmitting the challenge via the first communication channel,
   a light source receiver for receiving a response from the device via the second communication channel, and
   an authorizing means for authorizing the device to control the light source by matching the received response with a reference (ref), and if the received response matches the reference (ref), the device is authorized,
the device comprising:
   a device receiver for receiving the challenge via the first communication channel,
   a response generator for generating the response with the cryptographic function receiving arguments comprising the received challenge and a second cryptographic key, and
   a device transmitter for transmitting the response to the light source via the second communication channel.

2. A lighting system according to claim 1, wherein the light source comprises a pre-programmed unique light source identifier, wherein the challenge generator is configured to comprise the unique light source identifier as an additional argument of the cryptographic function.

3. A lighting system according to claim 2, wherein the first communication channel is a one-way broadcast channel.

4. A lighting system according to claim 3, wherein the light source transmitter is configured to regularly broadcast via the first communication channel the generated challenge as an identifier.

5. A lighting system according to claim 4, wherein the light source transmitter is configured to regularly broadcast the response instead of the challenge if the device is authorized by the light source.

6. A lighting system according to claim 1, wherein the device transmitter is configured to transmit a message via the second communication channel, the message comprising an identifier of the light source, and wherein the device transmitter is configured to use the generated response as the identifier in the message.

7. A lighting system according to claim 1, wherein the challenge generator is configured to comprise a previously generated challenge (chtn-1) or a previously received response in the arguments of the cryptographic function.

8. A lighting system according to claim 1, wherein the challenge generator is also configured to generate the reference (ref) with the cryptographic function receiving arguments comprising the generated challenge and the first cryptographic key.

9. A lighting system according to claim 1, wherein the light source comprises a pre-programmed unique light source identifier, wherein the light source further comprises a light source concatenation means for concatenating the challenge to the light source identifier, and wherein the light source transmitter is configured to transmit the concatenation.

10. A lighting system according to claim 1, wherein the device further comprises a device concatenation means for concatenating the generated response to the received challenge, and wherein the device transmitter is configured to transmit the concatenation.

11. A lighting system according to claim 1,
wherein the device further comprises a control command receiving means for receiving from a user a control command for controlling the light source,
wherein the device transmitter is configured to transmit the control command together with the response, and
the light source further comprising a light source controller for executing the control command being received together with the response, the light source controller is configured to execute the command only if the device is authorized by the light source.

12. A lighting system according to claim 1, wherein the light source is configured to allow the reception of a light source control command via the second communication channel during a predefined interval of time following the moment of time at which the device is authorized by the light source,
the light source further comprising a light source controller for executing the received light source control command.

13. A light source for use in the system according to claim 1, the light source comprising:
a challenge generator for generating a challenge with a cryptographic function receiving an argument comprising a first cryptographic key,
a light source transmitter for transmitting the challenge via a first communication channel from the light source to a device,
a light source receiver for receiving a response from the device over a second communication channel, and
an authorizing means for authorizing the device to control the light source by matching the received response with a reference (ref), and if the received response matches the reference (ref), the device is authorized.

14. A device for use in the system according to claim 1, the device comprising:
a device receiver for receiving a challenge via a first communication channel, the first communication channel being formed by modulating information in light emitted by a light source,
a response generator for generating a response with the cryptographic function receiving arguments comprising the received challenge and a second cryptographic key, and
a device transmitter for transmitting the response to the light source via a second communication channel.

15. Method of authorizing a device by a light source for allowing the device to control the light source, the method comprises the steps of:
generating a challenge with a cryptographic function receiving an argument comprising a first cryptographic key,
transmitting the challenge from the light source to the device via a first communication channel being formed by modulating information in light emitted by the light source,
receiving the challenge from the first communication channel,
generating a response with the cryptographic function receiving arguments comprising the received challenge and a second cryptographic key,
transmitting the response from the device to the light source via a second communication channel,
receiving the response from the second communication channel, and
authorizing the device by matching the received second pseudo identifier with a reference, and, if the received second pseudo identifier matches the reference, the device is authorized by the light source.

* * * * *